United States Patent
Dry et al.

(10) Patent No.: US 10,150,432 B2
(45) Date of Patent: Dec. 11, 2018

(54) AUTONOMOUS VEHICLE CONVERSION

(71) Applicant: Ford Global Technologies, LLC, Dearborn, MI (US)

(72) Inventors: Alan George Dry, Grosse Point Woods, MI (US); Johnathan Andrew Line, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 115 days.

(21) Appl. No.: 15/462,958

(22) Filed: Mar. 20, 2017

(65) Prior Publication Data

US 2018/0265019 A1 Sep. 20, 2018

(51) Int. Cl.
| | |
|---|---|
| *B60R 16/023* | (2006.01) |
| *B62D 25/06* | (2006.01) |
| *B60J 10/00* | (2016.01) |
| *B62D 65/04* | (2006.01) |
| *G05D 1/02* | (2006.01) |

(52) U.S. Cl.
CPC .......... *B60R 16/0231* (2013.01); *B60J 10/00* (2013.01); *B60R 16/0232* (2013.01); *B62D 25/06* (2013.01); *B62D 65/04* (2013.01); *G05D 1/021* (2013.01)

(58) Field of Classification Search
CPC ... B60R 9/04; B60R 16/0231; B60R 16/0232; B62D 25/06; G01D 11/30; G01S 13/931; G05D 1/0088; G05D 1/021; G05D 1/0231; G05D 1/0238; G05D 1/0223; G05D 1/0257; G05D 1/0289
USPC .................................................. 296/37.7, 210
See application file for complete search history.

(56) References Cited

U.S. PATENT DOCUMENTS

| | | | |
|---|---|---|---|
| 6,789,013 B2 | 9/2004 | Annett et al. | |
| 8,615,334 B2 | 12/2013 | Ewert | |
| 8,825,258 B2 | 9/2014 | Cullinane et al. | |
| 9,164,508 B1 | 10/2015 | Takach, Jr. | |
| 9,429,944 B2 | 8/2016 | Filippov et al. | |
| 9,557,736 B1* | 1/2017 | Silver ................ | G06K 9/00812 |
| 2006/0261109 A1* | 11/2006 | Browne ................. | B60R 9/04 |
| | | | 224/309 |
| 2008/0303315 A1* | 12/2008 | Johl ..................... | B60R 13/0206 |
| | | | 296/210 |
| 2014/0347819 A1* | 11/2014 | Ott ...................... | H05K 5/0082 |
| | | | 361/714 |

(Continued)

FOREIGN PATENT DOCUMENTS

DE      102016008064 A1    12/2016

OTHER PUBLICATIONS

Boyd, "Japan's Upgraded Mobile Mapping Technology Aims to Make Autonomous Driving Safer", IEEE Spectrum, Nov. 22, 2016, http://spectrum.ieee.org/cars-that-think/transportation/self-driving/japans-upgraded-mobile-mapping-technology-aims-to-make-autonomous-driving-safer (2 pages).

*Primary Examiner* — Jason S Daniels
(74) *Attorney, Agent, or Firm* — Jason C. Rogers; Bejin Bieneman PLC (57) ABSTRACT

An assembly includes a sensor module having an external surface configured to receive a seal and defining a perimeter. The assembly includes a plurality of sensors supported by the sensor module. The assembly includes a lock movable between a locked state and an unlocked state and supported by the sensor module within the perimeter. A computer is supported by the sensor module and is programmed to actuate the lock.

19 Claims, 5 Drawing Sheets

(56) References Cited

U.S. PATENT DOCUMENTS

2018/0015886 A1* 1/2018 Frank ................ B60R 11/04
2018/0037268 A1* 2/2018 Moore ............... B62D 25/06
2018/0150083 A1* 5/2018 Izadian ............. G05D 1/0088

* cited by examiner

AUTONOMOUS VEHICLE CONVERSION

BACKGROUND

An autonomous vehicle, for example, may include a controller that operates the vehicle in an autonomous mode, a semi-autonomous mode, or a non-autonomous mode. In the autonomous mode, the controller controls each of vehicle propulsion, braking, and steering. In a semi-autonomous mode, the computer controls one or two of vehicles propulsion, braking, and steering.

Autonomous vehicles include various sensors for operating without driver input. These sensors provide input to the computer for operation in the autonomous mode and/or the semi-autonomous mode. Many mass-produced vehicles do not have such sensors.

DETAILED DESCRIPTION

Disclosed herein is an assembly comprising a sensor module having an external surface configured to receive a seal and defining a perimeter. The assembly includes a plurality of sensors supported by the sensor module. The assembly includes a lock movable between a locked state and an unlocked state and supported by the sensor module within the perimeter. The assembly includes a computer supported by the sensor module and programmed to actuate the lock.

The assembly may include an interface module. The sensor module may be secured to the interface module with the lock. The interface module may include a bottom end opposite a top end, and define a passage extending through the bottom end and the top end. The sensor module may be supported by the top end of the interface module.

The assembly may include a releasable coupling supported by the sensor module and extending through the passage to the bottom end of the interface module. The releasable coupling may include a suction device. The releasable coupling may include a magnet.

The interface module may be moveable between a connected position connected to the top end and a disconnected position disconnected from the top end. The assembly may include a vehicle connection member secured to the bottom end of the interface module. The vehicle connection member may be accessible through the top end when the interface module is in the disconnected position and may be inaccessible through the top end when the interface module is in the connected position.

The assembly may include a first seal disposed between the sensor module and the top end of the interface module, the first seal abutting the external surface of the sensor module along the perimeter and the top end of the interface module. The assembly may further comprise a second seal mounted on the bottom end of the interface module.

The sensor module may abut the interface module and enclose the passage at the top end of the interface module.

The assembly may include an electrical wire extending from the sensor module within the perimeter.

Also disclosed herein is a vehicle. The vehicle includes a roof having a top surface. The vehicle includes interface module having a bottom end opposite a top end and defining a passage extend from the bottom end to the top end. The interface module is supported by the top surface of the roof and encloses the passage at the bottom end. The vehicle includes a sensor module supported by the interface module and enclosing the passage at the top end.

The vehicle may include a releasable coupling supported by the sensor module and extending through the passage of the interface module and releasably secured to the roof.

The interface module may be moveable between a connected position connected to the top end and a disconnected position disconnected from the top end. The vehicle may include a vehicle connection member securing the interface module to the roof, the vehicle connection member being accessible through the top end when the interface module is in the disconnected position and inaccessible through the top end when the interface module is in the connected position.

The vehicle may include a first seal disposed between the interface module and the sensor module, the first seal defining a first perimeter. The passage at the top end of the interface module may be located within the first perimeter.

The vehicle may include a second seal disposed between the interface module and the roof and defining a second perimeter, with the passage at the bottom end of the interface module located within the second perimeter.

The vehicle may include the roof including an opening, and an electrical wire extending from the sensor module through the first seal, the passage, and the second seal into the opening of the roof.

The vehicle may include a lock securing the sensor module to the interface module within the first perimeter. The sensor module may include a computer programmed to actuate the lock.

With reference to the Figures, wherein like numerals indicate like parts throughout the several views, an assembly 10 for enabling autonomous operation of a vehicle 12 includes a sensor module 14 and an interface module 16.

The vehicle 12 may be any type of passenger or commercial automobile such as a sedan, a station wagon, a sport utility vehicle, a crossover vehicle, a van, a minivan, a taxi, a bus, etc. Motion of the vehicle 12 is provided by vehicle braking, propulsion and steering systems, devices and components.

The vehicle 12 may be an autonomous vehicle. For example, the vehicle 12 may include a controller that operates the vehicle 12 in an autonomous mode, a semi-autonomous mode, or a non-autonomous mode. In the autonomous mode, the controller controls each of vehicle propulsion, braking, and steering. In a semi-autonomous mode, the controller controls one or two of vehicles propulsion, braking, and steering.

The braking system may be a known vehicle braking subsystem and resists the motion of the vehicle to thereby slow and/or stop the vehicle. The braking may be friction brakes such as disc brakes, drum brakes, band brakes, and so on; regenerative brakes; any other suitable type of brakes; or a combination. The braking is in communication with and receives input from the controller and a human driver. The human driver may control the braking via, e.g., a brake pedal.

The propulsion system of the vehicle 12 generates energy and translates the energy into motion of the vehicle. The propulsion system may be a known vehicle propulsion system, for example, a powertrain including an internal-combustion engine coupled to a transmission that transfers rotational motion to wheels; an electric powertrain including batteries, an electric motor, and a transmission that transfers rotational motion to the wheels; a hybrid powertrain including elements of the powertrain and the electric powertrain; or any other type of propulsion. The propulsion system is in communication with and receives input from the controller and from a human driver. The human driver may control the propulsion via, e.g., an accelerator pedal and/or a gear-shift lever The steering system may be a known vehicle steering subsystem and controls the turning of the wheels. The steering system is in communication with and receives input from a steering wheel and the controller. The steering system may be a rack-and-pinion system with electric power-assisted steering, a steer-by-wire system, or any other suitable system With reference to FIGS. 1 and 2, the vehicle 12 includes a roof 18 having a top surface 20. The roof 18 extends a width of the vehicle 12, i.e., in a cross-vehicle direction, and may include opposing edges that extend longitudinally over doors of the vehicle 12. The roof may include channels, also known as rain gutters, that extend longitudinally from a front to a back of the roof 18. The roof 18 may be made with any suitable material, e.g., steel, aluminum, fiber-reinforced plastic, etc.

Figure 1:
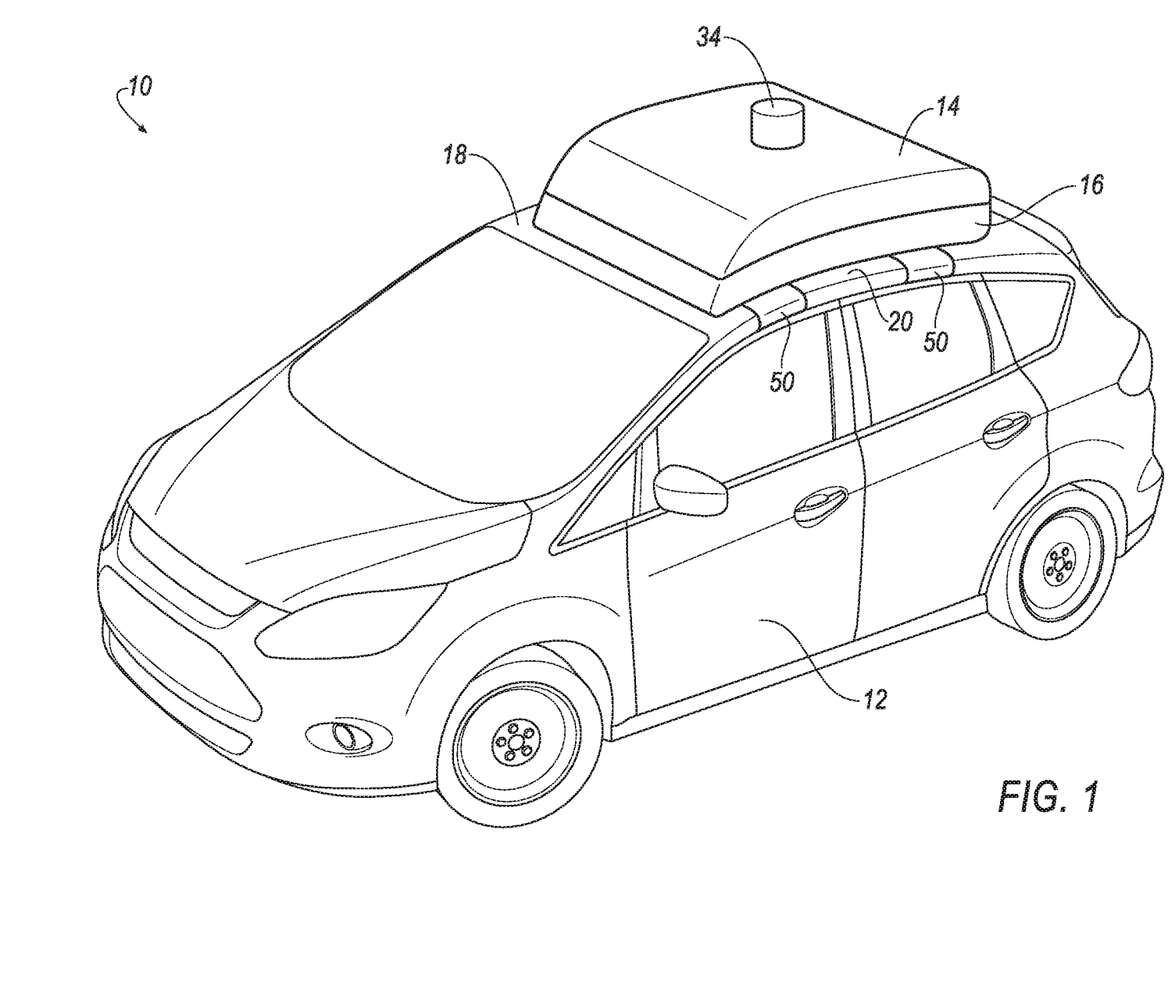
FIG. 1 is a perspective view of an example vehicle with an example sensor and interface modules.
Figure 2:
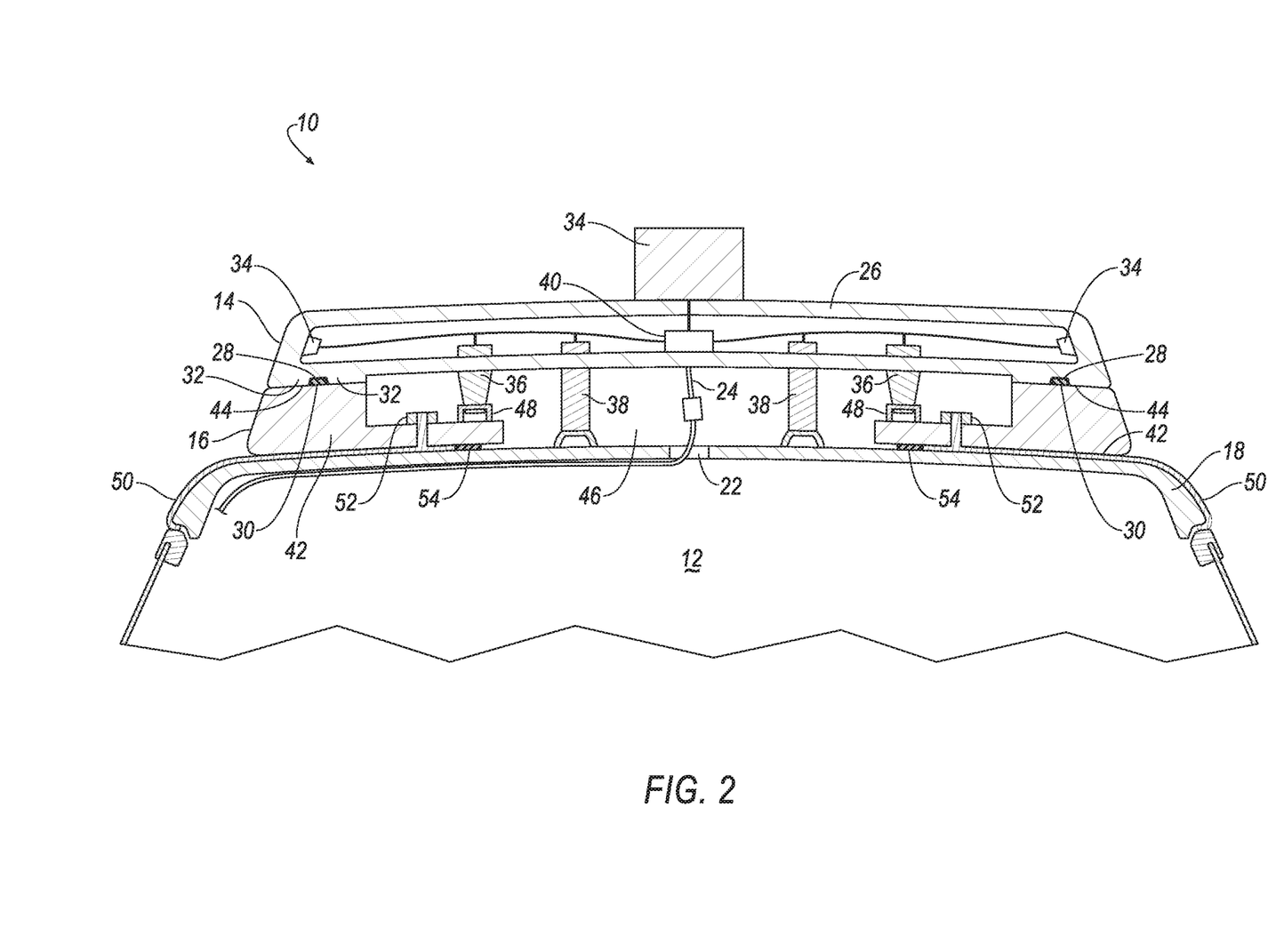
FIG. 2 is a cross sectional view of the vehicle with the sensor module and interface modules of FIG. 1.

The roof 18 includes an opening 22. The opening 22 enables connection of electrical wires 24 from the sensor module 14 to various autonomous vehicle components such that electrical information and commands may be communicated there between, as discussed below.

Figure 5:
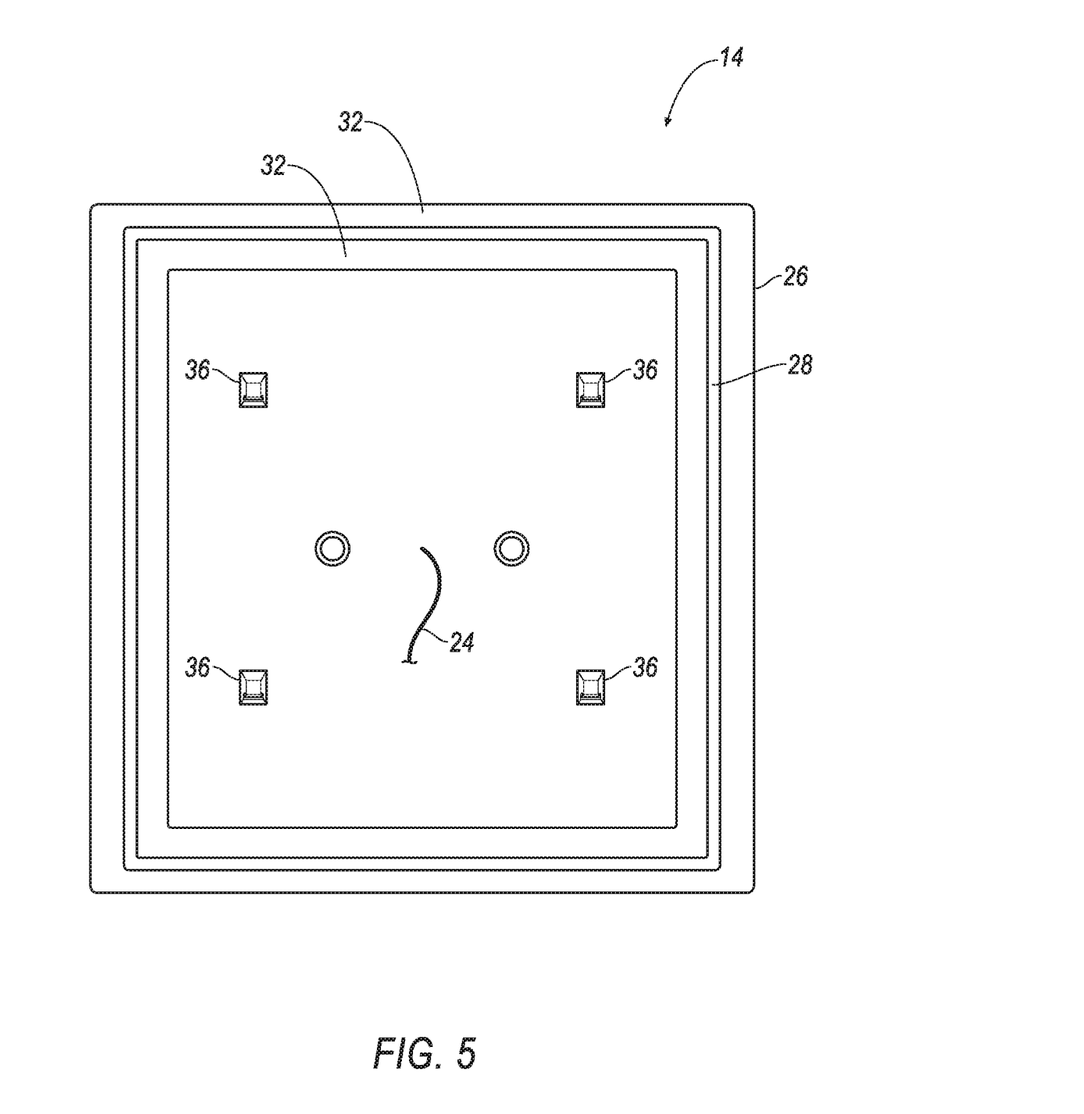
FIG. 5 is a bottom view of the sensor module.

With reference to FIGS. 2 and 5, the sensor module 14 includes a housing 26 that supports and/or encloses various components of the sensor module 14. The housing 26 of the sensor module 14 includes an external surface 28 configured to receive a first seal 30 and defining a perimeter. The external surface 28 may be configured to receive the first seal 30 by providing a flat, continuous, impermeable area that, when abutting the first seal 30, prohibits the flow of liquid, such a rainwater, there between. The external surface 28 defining the perimeter may be further configured to receive the first seal 30 by including a pair of elevated portions 32 that extend generally normally from the external surface 28, each elevated portion 32 bordering opposing sides of the external surface 28 and extending the length of the perimeter, the elevated portions 32 and external surface 28 defining a channel to receive the first seal 30.

A plurality of sensors 34 is supported by the sensor module 14. The sensors 34 may detect the position or orientation of the sensor module 14, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 34 may detect the external world, for example, radar sensors, scanning laser range finders, light detection and ranging (LIDAR) devices, and image processing sensors such as cameras. The sensors 34 may include communications devices, for example, vehicle-to-infrastructure (V2I) or vehicle-to-vehicle (V2V) devices. The sensors 34 may be supported on and/or within the housing 26.

Figure 3:
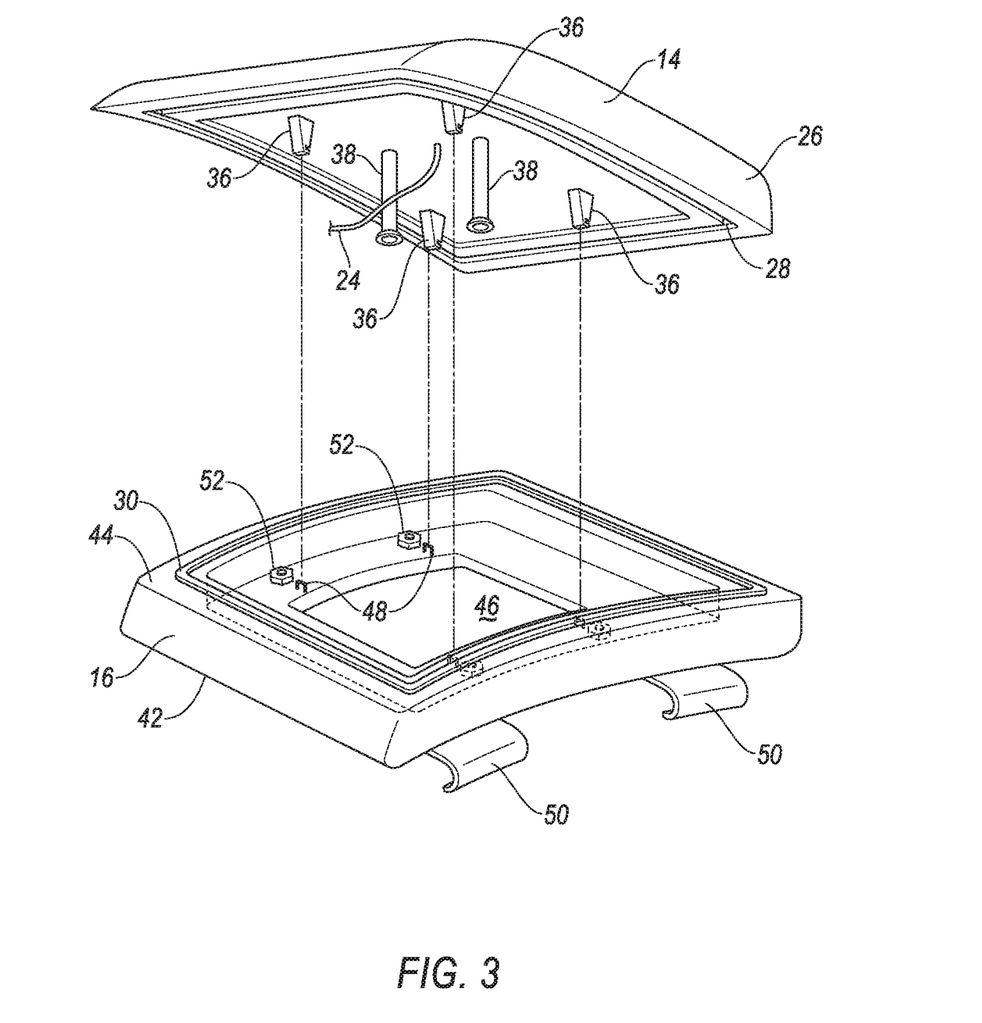
FIG. 3 is a perspective view of the sensor and interface modules in a disconnected position.

With reference to FIGS. 2 and 3, a lock 36 is supported by the sensor module 14 within the perimeter defined by the external surface 28. For example, the lock 36 may be secured to the housing 26. The lock 36 is movable between a locked state, e.g., while the sensor module 14 is supported on the interface module 16 as shown in FIG. 2, and an unlocked state. The lock 36 includes a latch retaining member that is movable between a first position, e.g., the locked state, and a second position, e.g., the unlocked state. In the first position the latch retaining member inhibits removal of a latch 48 from the lock 36. In the second position the latch retaining member does not inhibit removal of the latch 48 from the lock 36. The latch retaining member may be mechanically connected to an actuator, e.g., a rack and pinion type linear actuator, to move the latch retaining member between the first and second position. The lock 36 includes electo-mechanical components, e.g., circuits, chips, actuators, etc., to enable the lock 36 to transition between the locked state and the unlocked state, e.g., to actuate to move the latch retaining member in response to a received electrical command, e.g., similar to a vehicle power door lock.

A releasable coupling 38 may be supported by the sensor module 14. For example, the releasable coupling 38 may be secured to, and extend away from, the housing 26. The releasable coupling 38 enables the sensor module 14 to be releasably secured to the roof 18, e.g., a distal end of the releasable coupling 38 may include a suction device or a magnet. The releasable coupling 38 may include electo-mechanical components, e.g., circuits, chips, actuators, etc., to enable the releasable coupling 38 to change length and to selectively secure to the roof 18. For example, the releasable coupling 38 may include an actuator or pump to generate suction with the suction device, and or an electronically switchable magnet that includes a pair permanent magnets within a housing, wherein rotation of the one permanent magnet relative to the other increases or decreases the magnetic field provided by the switchable magnet.

With reference to FIG. 2, a computer 40 is supported by the sensor module 14. For example, the computer 40 may be mounted within the housing 26. The computer 40 may be a microprocessor-based controller implemented via circuits, chips, antenna, a transceiver, or other electronic components. For example, the computer 40 may include a processor, memory, etc. The memory of the computer 40 may include memory for storing instructions executable by the processor as well as for electronically storing data and/or databases. The computer 40 may be in electronic communication with the lock 36, the releasable coupling 38, the sensors 34, etc.

The computer 40 may be programmed to actuate the lock 36. For example, the computer 40 may send an electronic command to the lock 36 to actuate to the locked or unlocked state in response to receiving a message from another computing device, such as a user's smart phone.

The computer 40 may be programmed to actuate the releasable coupling 38. For example, the computer 40 may send an electronic command to the releasable coupling 38 to actuate the releasable coupling 38 to change length (e.g., get longer or shorter), and/or to secure or release from the roof 18, e.g., to actuate the suction device or magnet, in response to receiving a message from another computing device, such as the user's smart phone.

With reference to FIG. 2, the electrical wire 24 extends from the sensor module 14 within the perimeter defined by the external surface 28. The electrical wire 24 is in electrical communication with the computer 40 such that information and commands from the sensors 34 and the computer 40 may be transmitted to components of the vehicle 12 to enable autonomous operation. For example, the electrical wire 24 may provide communication with various servos, actuators, etc., installed in the vehicle 12 to control the braking, propulsion and steering, e.g., by providing movement to the brake pedal, accelerator pedal, and steering wheel. Additionally or alternatively, the servos, actuators, etc., may control movement of other vehicle components to control movement of the vehicle 12, and/or the electrical wire 24 may provide information and commands to a vehicle controller operating drive-by-wire components.

The interface module 16 includes a bottom end 42 opposite a top end 44 and defines a passage 46 extending through the bottom end 42 and the top end 44. The interface module 16 may include the latch 48 configured to be received by the lock 36. When the latch 48 is received by the lock 36, and the lock 36 is in the locked state, the latch 48 may not be removed from the lock 36. When the latch 48 is received by the lock 36, and the lock 36 is in the unlocked state, the latch 48 may be removed from the lock 36. Accordingly, the latch 48 and lock 36 enable the sensor module 14 to be secured to the interface module 16.

Figure 4:
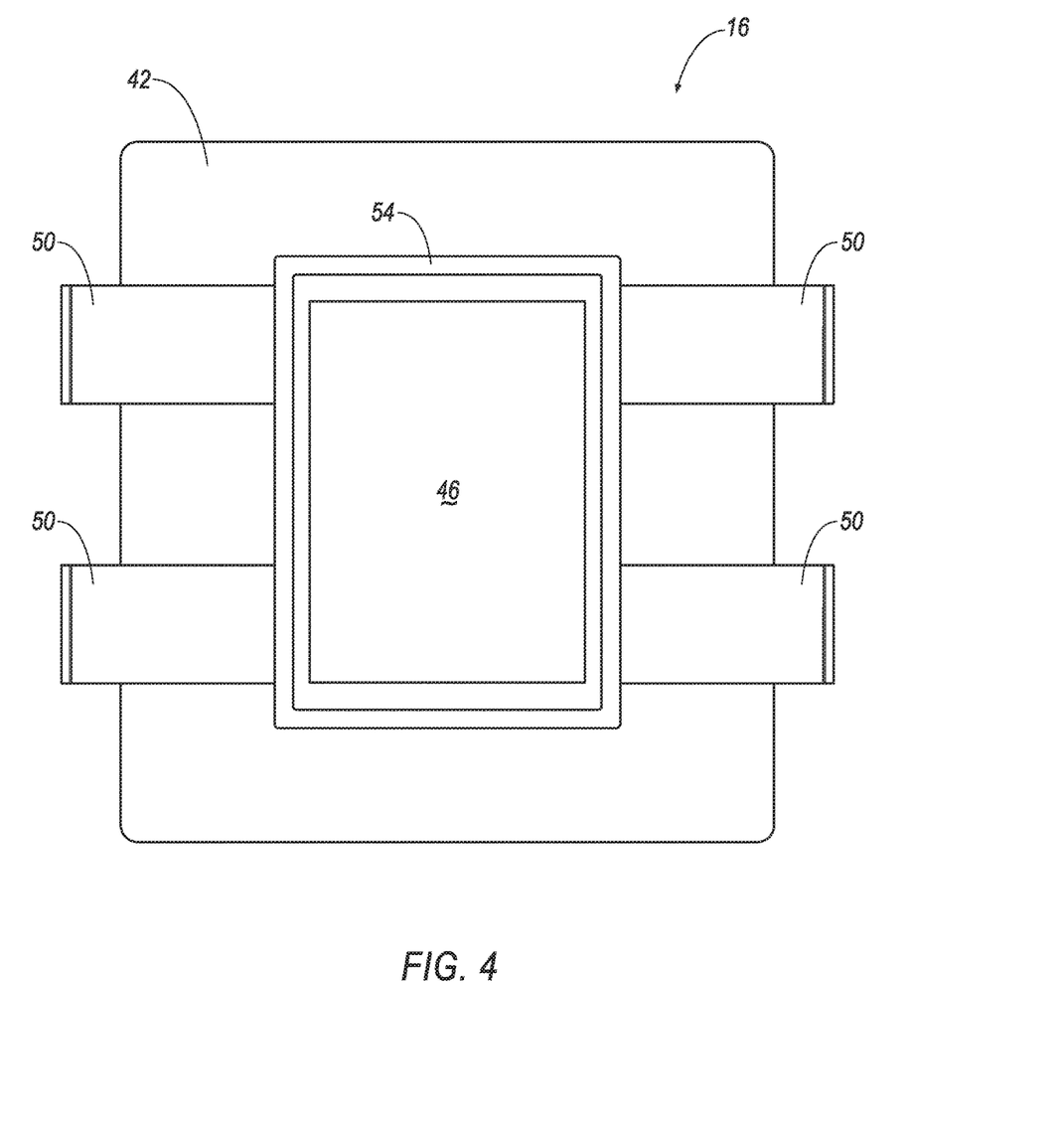
FIG. 4 is a bottom view of the interface module.

With reference to FIGS. 2-4, a vehicle connection member 50 may be secured to the bottom end 42 of the interface module 16. For example, a fastener 52 may secure the vehicle connection member 50 to the interface module 16. The fastener 52 may be accessible via the passage 46. The vehicle connection member 50 is configured to secure to the vehicle 12. For example, the vehicle connection member 50 may have a hook shape configured to engage with the edges or channel of the roof 18.

The interface module 16 may be supported by the top surface 20 of the roof 18. For example, the interface module 16 may be supported on the roof 18 with the bottom end 42 of the interface module abutting the roof 18, e.g., with only the vehicle connection member 50 and a second seal 54 (discussed below) disposed there between. In such position, the roof 18 encloses the passage 46 at the bottom end 42.

The vehicle connection member 50 may secure the interface module 16 to the roof 18. For example, the vehicle connection member 50 may engage with the edge or channel of the roof 18 and secure to interface module 16 with the fastener 52, wherein disengagement of the vehicle connection member 50 from the roof 18 requires the fastener 52 to be loosened, or otherwise adjusted.

With reference to FIGS. 2 and 3, the sensor module 14 may be supported by the top end 44 of the interface module 16. For example, the sensor module 14 may be positioned on top of the interface module 16, with the housing 26 abutting the top end 44 of the interface module 16 about the perimeter defined by the external surface 28, e.g., with only the first seal 30 disposed there between. In such position, the sensor module 14 encloses the passage 46 at the top end 44 of the interface module 16.

The sensor module 14 may be secured to the interface module 16 with the lock 36. For example, when the sensor module 14 is supported on, and abuts, the interface module 16, the latch 48 of the interface module 16 may be received by the lock 36 of the sensor module 14, as described above.

With the sensor module 14 supported by the interface module 16, and the interface module 16 supported by the roof 18, the releasable coupling 38 may extend through the passage 46 to the bottom end 42 of the interface module 16 and releasably secure to the roof 18. For example, the length of the releasable coupling 38 may be configured to be long enough to permit extension of the releasable coupling 38 through the passage 46 such that the magnetic or suction device of the releasable coupling 38 engages the roof 18.

With the sensor module 14 supported by the interface module 16, and the interface module 16 supported by the roof 18, the passage 46 may be insulated from liquid or other foreign objects with the first seal 30 and the second seal 54. The first seal 30 and the second seal 54 may be made from a pliable material, such as rubber or silicon, that conforms to a surface against which it is pressed.

With reference to FIGS. 2 and 3, the first seal 30 may be disposed between the sensor module 14 and the top end 44 of the interface module 16. For example, the first seal 30 may abut the external surface 28 of the sensor module 14 along the perimeter defined by the external surface 28 and the top end 44 of the interface module 16. In such arrangement, the first seal 30 defines a first perimeter. The perimeter of the first seal 30 is dimensioned to conform to the perimeter defined by the external surface 28. The passage 46 at the top end 44 of the interface module 16 may be located within the first perimeter. For example, the first seal 30 may be mounted on the top end 44 of the interface module 16 to surround the passage 46 at the top end 44. The first seal 30 may be secured to the sensor module 14 or the interface module 16, e.g., with an adhesive.

With reference to FIG. 2, the second seal 54 is disposed between the interface module 16 and the roof 18. The second seal 54 defines a second perimeter. The passage 46 at the bottom end 42 of the interface module 16 may be located within the second perimeter. For example, the second seal 54 may be mounted on the bottom end 42 of the interface module 16 to surround the passage 46 at the bottom end 42. The second seal 54 may be secured to the interface module 16, e.g., with an adhesive.

With reference to FIG. 2, with the sensor module 14 supported by the interface module 16, and the interface module supported by the roof 18, the electrical wire 24 extends from the sensor module 14 through the first seal 30, the passage 46, and the second seal 54 into the opening 22 of the roof 18. The electrical wire 24 may include an electrical connector 56 to permit the sensor module 14 to be selectively connected and disconnected with the vehicle 12. Within the vehicle 12 information and command transmitted via the electrical wire 24 may be received by various components for autonomous operation of the vehicle 12, as described above.

While the lock 36 is in the unlocked state, the interface module 16 is moveable between a connected position and a disconnected position.

In the connected position the sensor module 14 is connected to the top end 44 of the interface module 16, e.g., with the latch 48 received in the lock 36, and the housing 26 abutting the top end 44 of the interface module 16 to enclose the passage 46 at the top end 44 of the interface module 16, as shown in FIGS. 1-2. When the interface module 16 is in the connected position the vehicle connection member 50 is inaccessible through the top end 44, e.g., the fastener 52 securing the vehicle connection member 50 is blocked by the sensor module 14.

In the disconnected position the sensor module 14 is disconnected from the top end 44. For example, the sensor module 14 does not abut the interface module 16 to enclose the passage 46 at the top end 44. Accordingly, when the interface module 16 is in the disconnected position the vehicle connection member 50 is accessible through the top end 44, e.g., the fastener 52 securing the vehicle connection member 50 is not blocked by the sensor module 14, as shown in FIG. 3.

The adjectives "first" and "second" are used throughout this document as identifiers and are not intended to signify importance or order.

Controllers and computing devices, such as the computer 40, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a sensor module having an external surface configured to receive a seal and defining a perimeter;
a plurality of sensors supported by the sensor module;
a lock movable between a locked state and an unlocked state and supported by the sensor module within the perimeter; and
a computer supported by the sensor module and programmed to actuate the lock.

2. The assembly of claim 1, further comprising an interface module, the sensor module secured to the interface module with the lock.

3. The assembly of claim 2, wherein the interface module includes a bottom end opposite a top end and defines a passage extending through the bottom end and the top end, the sensor module supported by the top end of the interface module.

4. The assembly of claim 3, further comprising a releasable coupling supported by the sensor module and extending through the passage to the bottom end of the interface module.

5. The assembly of claim 4, wherein the releasable coupling includes a suction device.

6. The assembly of claim 4, wherein the releasable coupling includes a magnet.

7. The assembly of claim 3, wherein the sensor module is moveable between a connected position connected to the top end and a disconnected position disconnected from the top end, and further comprising a vehicle connection member secured to the bottom end of the interface module, the vehicle connection member being accessible through the top end when the sensor module is in the disconnected position and inaccessible through the top end when the sensor module is in the connected position.

8. The assembly of claim 3, further comprising a first seal disposed between the sensor module and the top end of the interface module and abutting the external surface of the sensor module along the perimeter and the top end of the interface module.

9. The assembly of claim 8, further comprising a second seal mounted on the bottom end of the interface module.

10. The assembly of claim 3, wherein the sensor module abuts the interface module and encloses the passage at the top end of the interface module.

11. The assembly of claim 1, further comprising an electrical wire extending from the sensor module within the perimeter.

12. A vehicle comprising:
a roof having a top surface;
an interface module having a bottom end opposite a top end and defining a passage extending from the bottom end to the top end, the interface module supported by the top surface of the roof and enclosing the passage at the bottom end; and
a sensor module supported by the interface module and enclosing the passage at the top end.

13. The vehicle of claim 12, further comprising a releasable coupling supported by the sensor module and extending through the passage of the interface module and releasably secured to the roof.

14. The vehicle of claim 12, wherein the sensor module is moveable between a connected position connected to the top end and a disconnected position disconnected from the top end, and further comprising a vehicle connection member securing the interface module to the roof, the vehicle connection member being accessible through the top end when the sensor module is in the disconnected position and inaccessible through the top end when the sensor module is in the connected position.

15. The vehicle of claim 12, further comprising a first seal disposed between the interface module and the sensor module and defining a first perimeter, the passage at the top end of the interface module located within the first perimeter.

16. The vehicle of claim 15, further comprising a second seal disposed between the interface module and the roof and defining a second perimeter, the passage at the bottom end of the interface module located within the second perimeter.

17. The vehicle of claim 16, further comprising the roof including an opening, and an electrical wire extending from the sensor module through the first seal, the passage, and the second seal into the opening of the roof.

18. The vehicle of claim 15, further comprising a lock securing the sensor module to the interface module within the first perimeter.

19. The vehicle of claim 18, the sensor module further comprising a computer programmed to actuate the lock.

* * * * *

UNITED STATES PATENT AND TRADEMARK OFFICE
CERTIFICATE OF CORRECTION

PATENT NO. : 10,150,432 B2  
APPLICATION NO. : 15/462958  
DATED : December 11, 2018  
INVENTOR(S) : Alan George Dry et al.

It is certified that error appears in the above-identified patent and that said Letters Patent is hereby corrected as shown below:

In the Claims

Column 8, Line 45, Claim 14:   replace "interface" with --sensor--

Signed and Sealed this  
Tenth Day of September, 2019

Andrei Iancu  
*Director of the United States Patent and Trademark Office*